US006614916B2

(12) United States Patent
MacDonald

(10) Patent No.: US 6,614,916 B2
(45) Date of Patent: Sep. 2, 2003

(54) MACHINE VISION SYSTEM AND TRIGGERING METHOD

(75) Inventor: Virginia N. MacDonald, Apex, NC (US)

(73) Assignee: Bell & Howell Mail and Messaging Technologies Company, Durham, NC (US)

(*) Notice: Subject to any disclaimer, the term of this patent is extended or adjusted under 35 U.S.C. 154(b) by 89 days.

(21) Appl. No.: 09/754,704

(22) Filed: Jan. 4, 2001

(65) Prior Publication Data

US 2002/0106107 A1 Aug. 8, 2002

(51) Int. Cl.[7] .................................................. G06K 9/00
(52) U.S. Cl. ........................ 382/101; 209/584; 705/406
(58) Field of Search ................................ 382/100–103, 382/137, 140, 141, 151, 181, 190, 266, 306, 312; 707/500; 270/52.02; 101/93.11; 348/131; 198/394; 209/584; 705/406

(56) References Cited

U.S. PATENT DOCUMENTS

| 4,499,372 A | * | 2/1985 | Nakano ................... 250/223 R |
| 4,697,689 A | * | 10/1987 | Carrell ....................... 198/394 |
| 4,701,094 A | * | 10/1987 | Courjaret et al. ........... 209/586 |
| 4,736,447 A | * | 4/1988 | Korsinsky ................... 382/325 |
| 4,863,037 A | | 9/1989 | Stevens et al. ............. 53/381.3 |
| 4,998,626 A | | 3/1991 | Ota ............................. 382/102 |
| 5,067,088 A | * | 11/1991 | Schneiderhan ........... 270/52.02 |
| 5,191,525 A | * | 3/1993 | LeBrun et al. .............. 707/500 |
| 5,319,562 A | | 6/1994 | Whitehouse |
| 5,429,698 A | * | 7/1995 | Hartman et al. .......... 101/93.11 |
| 5,515,159 A | * | 5/1996 | Sites et al. .................. 348/131 |
| 5,708,261 A | * | 1/1998 | Chen ...................... 235/462.18 |
| 5,889,269 A | | 3/1999 | Bridgelall et al. |
| 5,966,457 A | * | 10/1999 | Lemelson ................... 382/141 |
| 6,119,051 A | * | 9/2000 | Anderson et al. ........... 700/221 |
| 6,175,380 B1 | * | 1/2001 | Van Den Bosch .......... 348/125 |
| 6,176,428 B1 | | 1/2001 | Joseph et al. |
| 6,266,575 B1 | | 7/2001 | Anderson, Jr. et al. |

OTHER PUBLICATIONS

COGNEX, "Cognex CVC 1000 Camera Specifications," http://www.cognex.com, (Nov., 2000).

* cited by examiner

Primary Examiner—Jayanti K. Patel
(74) Attorney, Agent, or Firm—McDermott, Will & Emery

(57) ABSTRACT

A machine vision system and associated triggering method utilizes images acquired by a video camera to trigger the video camera to acquire an image feature of interest. The video camera continuously acquires images of an object using a portion of the total field of view of the video camera. The acquired images are compared to a signature image. In response to determining that one or more of the acquired images matches the signature, the video camera is triggered to acquire a full-frame image which contains the feature of interest.

42 Claims, 7 Drawing Sheets

MACHINE VISION SYSTEM AND TRIGGERING METHOD

TECHNICAL FIELD

The present invention relates to machine vision systems. More particularly, the present invention relates to a machine vision system and a method for triggering a machine vision system.

BACKGROUND ART

Machine vision is currently utilized throughout commercial industry in a wide variety of applications. For example, machine vision technology is used in semiconductor wafer fabrication, pharmaceutical manufacturing, food processing, mailpiece processing, circuit board assembly, and many other areas. A common attribute of machine vision systems is the utilization of some type of video camera. The camera is used to obtain an electronic image of a feature of interest. For example, in mailpiece processing, a video camera may be used to obtain an electronic image of a bar code printed on a mailpiece.

In order to obtain an image, the camera exposes an array of light-sensitive devices to the image. The devices convert the light reflected from the object being imaged, into an electrical signal. The electrical signal is converted into digital data, which is transferred from the camera into the memory of the vision system. The vision system performs image processing and analysis on the image. For example, if the image is that of a bar code, the vision system may decode the bar code.

One problem in conventional machine vision systems is determining when to begin to acquire the image of interest. Most vision systems have a trigger input that instructs the camera as to when to acquire the image. The timing of this trigger input is critical to correct acquisition of the image. If the feature of interest is not within the field of view of the camera when the trigger signal is input to the camera, the correct image will not be acquired.

The problem of determining when to trigger acquisition of an image is particularly acute in the mailpiece processing industry. As used herein, the phrase "mailpiece processing" refers to the processing of mailpieces, i.e., sheet articles, that are destined for a postal service mailstream. In mailpiece processing, individual mailpieces include machine-readable symbols printed on the paper media comprising the mailpiece. The machine-readable symbols contain data that is critical to mailpiece processing, such as customer account numbers, mailpiece set and sequence numbers, page numbers, and insert selection data. A variety of symbologies can be used to encode this information, such as Code 39, Interleaved 2 of 5, DataMatrix, DataGlyph, and optical character recognition (OCR). It is the job of the vision system to read the codes printed on the mailpiece and decode the information correctly to ensure that the mailpiece is assembled and finished correctly.

In order for correct decoding of symbols to occur in mailpiece processing, a camera image of the symbol must be acquired by the vision system. For this to be accomplished, the acquisition must occur at the specific instant of time when the symbol resides within the camera's field of view. In other words, the vision system must be triggered at just the right moment. Such triggering is difficult in mailpiece processing due to the high speed at which mailpieces pass sensors and the fact that symbols are printed at different locations on different mailpieces.

A conventional solution to triggering acquisition of an image in mailpiece processing is to use a sensor separate from the camera to trigger acquisition of the video image. For example, the sensor might be an optical sensor that is mounted on a mailpiece processing device, such as a sheet feeder. Typically, the camera is positioned at a predetermined distance from the sensor such that when the sensor detects the edge of a mailpiece, the symbol printed on the mailpiece is within the field of view of the camera. Accordingly, when the sensor detects the edge, the sensor sends a signal to the vision system, which triggers the video camera to acquire the image of the symbol. In order to account for different symbol locations on different mailpieces, the camera is typically mounted on a mechanical slide so that the relative position between the camera and the optical sensor can be varied according to different jobs.

The external sensor approach to machine vision system triggering in mailpiece processing has a number of disadvantages. For example, using an external optical sensor to trigger acquisition of a video image requires additional hardware and cabling to be connected to the mailpiece processing equipment. An external optical sensor includes a housing and cabling that must be mechanically coupled to the mailpiece processing equipment. Because space on mailpiece processing devices, such as cutters and sheet feeders, is limited, finding a place to mount such additional hardware can be difficult. Moreover, additional hardware and cabling increases the cost of the machine vision system.

Another disadvantage associated with external sensors is that they can be unreliable in that they may trigger on features of an object other than the desired triggering feature. For example, in one mailpiece processing system, a reflective sensor was supposed to trigger on the edge of a mailpiece. The mailpiece at issue included dark horizontal lines printed parallel to the edge. The reflective sensor triggered on the edge and on the dark horizontal lines. Such false triggering caused the video camera to acquire incorrect images.

In another example, a mailpiece processing device, such as a cutter, may supply the triggering signal for the camera. A cutter is a mailpiece processing device that receives a continuous roll of paper and cuts the paper into sheets at predetermined intervals. Paper is fed from the roll into the cutter, and a blade cuts the paper into sheets that are sized according to the particular mailpiece processing job. Because the blade cuts the paper at a specific time, the time of actuation of the blade can be used to trigger acquisition of an image of a feature of interest.

The use of the cutter blade actuation time to trigger image acquisition is disadvantageous because the video camera must always be located at a fixed distance from the cutting blade. This distance is defined by the location or distance between the edge of a mailpiece corresponding to the cut and a feature of interest. This position may not be available on the cutter due to mechanical obstructions. If the position is not available, the bar code or other feature of interest must be moved to a different location on the mailpiece. This is undesirable because it limits flexibility in mailpiece layout. Accordingly, there exists a long-felt need for methods and systems for triggering machine vision systems that avoid at least some of the difficulties associated with conventional triggering methods.

DISCLOSURE OF THE INVENTION

The present invention includes methods and systems for machine vision system triggering that eliminate the need for triggering hardware separate from the video camera used to acquire the image. In one example, a machine vision system triggering method utilizes a programmable acquisition video camera to produce the triggering signal and to acquire the image. A programmable acquisition video camera is a video camera that allows the size of the field of view of the acquired camera image to be dynamically varied. Because the field of view can be varied, the time required to acquire and process an image can be varied. For example, it takes longer to acquire and process an image comprising the total field of view of the camera than it does to acquire and process an image comprising a single video line. Because the time for the camera to acquire and process an image is often limited by the speed at which objects pass the camera, it may be desirable to use only a portion of the total field of view of the video camera when speed is the primary concern and to use the full field of view when full image acquisition is the primary concern.

One instance in which speed is the primary concern is in detecting signatures of features used to trigger acquisition of a full frame image. When detecting signatures, the camera may be programmed to continuously acquire images consisting of a subset of the total field of view of the camera. For example, the video camera can be programmed to acquire a single video line. Next, the images acquired by the camera are analyzed to determine whether a signature is present. In mailpiece processing, such a signature may be the electrical signal produced when the video camera acquires an image of an edge of a mailpiece or a unique feature printed on the mailpiece. Such a feature is preferably selected such that when the signature for the feature is detected, the feature of interest is either within the field of view of the camera or will be within the field of view within a determinable time. In response to detection of the signature, the vision system triggers the camera to acquire the full video image. In this manner, the machine vision system can be triggered without the use of additional hardware.

The feature corresponding to the signature used to produce the triggering signal will be referred to herein as the triggering feature. The feature corresponding to the image that is acquired in response to the triggering signal will be referred to as the feature of interest.

Accordingly, it is an object of the present invention to provide a system and method for triggering a machine vision system that avoids the difficulties associated with conventional triggering systems and methods.

Some of the objects of the invention having been stated hereinabove, other objects will be evident as the description proceeds, when taken in connection with the accompanying drawings as best described hereinbelow.

BRIEF DESCRIPTION OF THE DRAWINGS

Preferred embodiments of the present invention will now be explained with reference to the accompanying drawings of which.

DETAILED DESCRIPTION OF THE INVENTION

The present invention includes a machine vision system and a method for triggering a machine vision system based on a signature acquired by the same video camera used to acquire the image of the feature of interest. Because the same video camera used to acquire the image of the feature of interest is used to supply the triggering signal, the hardware required to implement the present invention is greatly reduced over conventional machine vision systems. In addition, because the camera supplies its own triggering signal, flexibility in camera location is increased over conventional machine vision systems triggered based on mechanical components, such as cutter blades.

Figure 1:
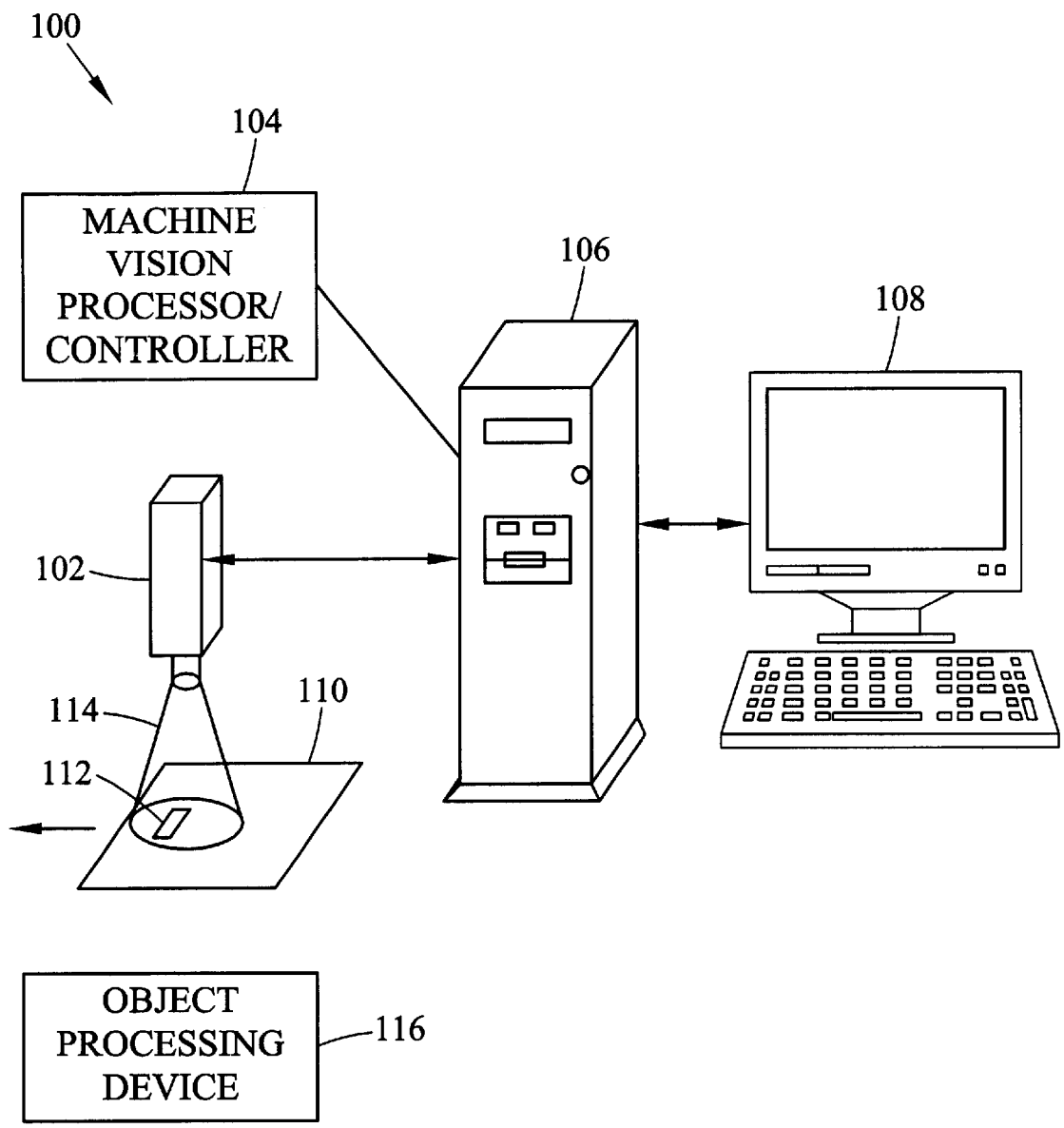
FIG. 1 is a schematic diagram of a machine vision system according to an embodiment of the present invention.

FIG. 1 is a partial schematic/partial block diagram of a machine vision system according to an embodiment of the present invention. In FIG. 1, machine vision system 100 includes a video camera 102 and a machine vision processor/controller 104. Machine vision processor/controller 104 may include hardware and software resident on a computer 106. Computer 106 may include a user interface 108 to display output to and receive input from a machine vision system user. Although not illustrated in FIG. 1, machine vision system 100 preferably also includes an optical source for illuminating objects for which images are being acquired. Machine vision system 100 is adapted to detect a signature corresponding to a predetermined triggering feature of an object 110. In response to detecting the signature, machine vision system 100 triggers acquisition of a full frame image of a feature of interest 112 when the feature 112 is within the field of view 114 of video camera 102.

Video camera 102 is preferably a programmable acquisition video camera. A programmable acquisition video camera is a camera in which the field of view can be adjusted in software and/or hardware. Examples of commercially available programmable acquisition video cameras suitable for use in a vision system according to an embodiment of the present invention include the CVC-1000™ available from Cognex, or the XC-HR300® available from Sony. Any vision system that can be programmed to detect a signature and subsequently acquire a full frame image of the feature of interest is within the scope of the invention.

Machine vision processor/controller 104 includes software that executes on computer 106 to control the video camera 102 to trigger based on predetermined signature detected by vision processor/controller 104. Tools for developing such software are included with the purchase of any of the above-referenced programmable acquisition video cameras. In particular, a user creates a job file that instructs camera 102 on how to acquire the image using vision system software. The job file is loaded into vision system memory and used to acquire images of a feature of interest. Steps that may be included in a job file and performed by a video camera in detecting a signature and triggering based on the signature will be discussed in more detail below.

Machine vision system 100 may be coupled to or operatively associated with one or more object processing devices 116. For example, if object 110 is a mailpiece, object processing device 116 may be a mailpiece processing device that performs a mailpiece processing function based on information contained within feature of interest 112 printed on the mailpiece. Exemplary mailpiece processing devices with which machine vision systems according to embodiments of the present invention may be used include mailpiece sorters, cutters, inserters, sheet feeders, or any other mailpiece processing device. Exemplary mailpiece processing functions performed by these devices based on symbols read from a mailpiece is found, for example, in commonly-assigned co-pending U.S. patent application Ser. No. 09/636,175, filed Aug. 10, 2000, the disclosure of which is incorporated herein by reference in its entirety.

Computer 106 may be a personal computer with a vision processor card for processing images acquired by video camera 102. Because computer 106 performs image processing, which is typically processor-intensive, it is preferable that computer 106 have sufficient processor speed and random access memory. An example of a commercially-available personal computer suitable for use as computer 106 is the OPTIPLEX™ available from Dell Corporation. User interface 108 may include a display device, such as a cathode ray tube or liquid crystal display device, and an input device, such as a keyboard and a mouse. User interface 108 allows the user to interact with the machine vision system.

Figure 2:
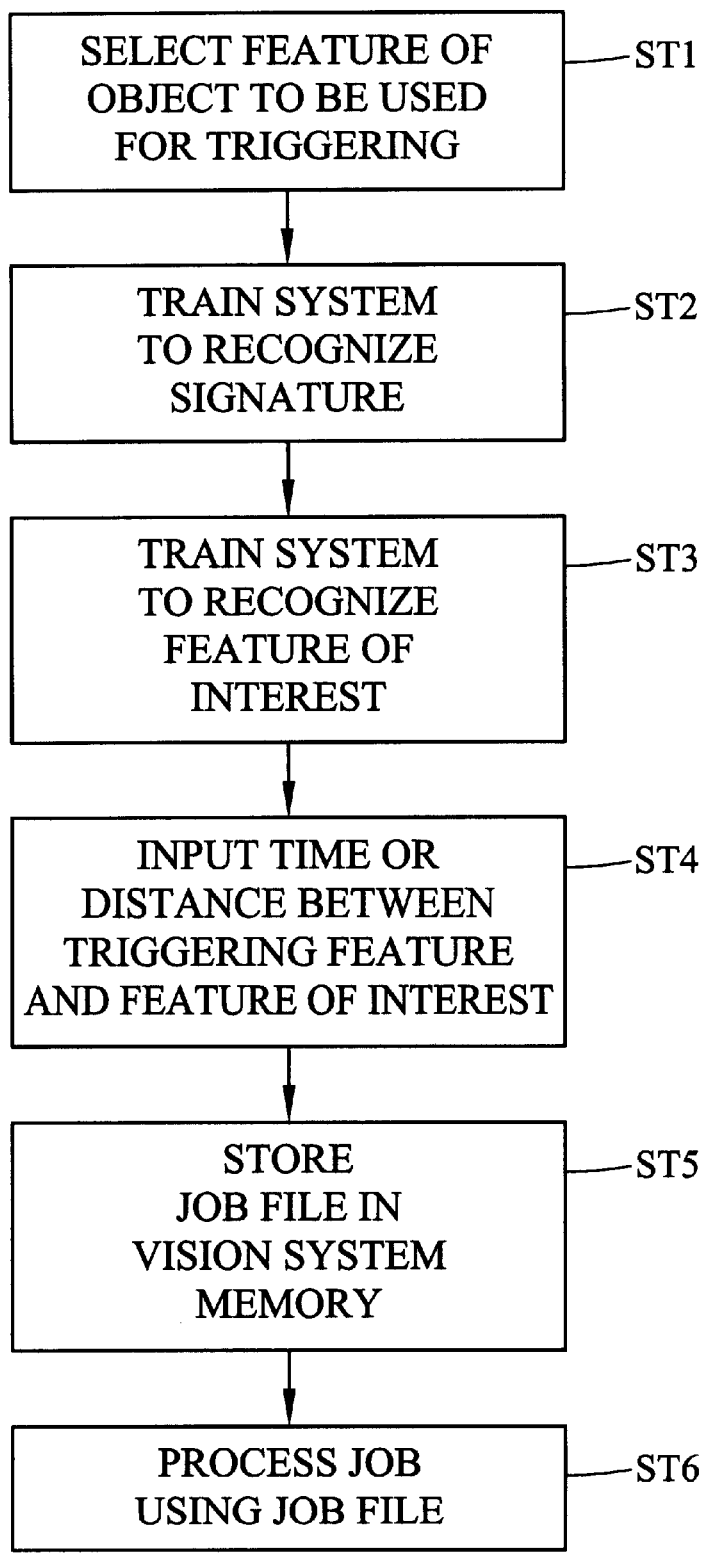
FIG. 2 is a flow chart illustrating the overall process for configuring a machine vision system to trigger based on a signature acquired by a video camera according to an embodiment of the present invention.

FIG. 2 is a flow chart illustrating exemplary steps that may be performed in configuring vision system 100 to trigger based on a signature acquired by video camera 102. Referring to FIG. 2, in step ST1, the user selects a feature associated with an object of interest to be used for triggering. Such a feature is preferably unique to prevent false positives. Exemplary signatures that may be detected will be discussed in more detail below.

In step ST2, once the feature has been selected, the user trains the system to recognize the signature corresponding to the feature. As used herein, the term "signature" refers to the electrical signal produced by the camera when the triggering feature is within the field of view of the camera. Training the system to recognize the signature can include placing the triggering feature within the camera field of view, acquiring an image of the signature, and using the "train" feature of commercially available vision system software. In step ST3, a similar step is performed for the feature of interest. In step ST4, the user inputs the time or distance between the triggering feature and the feature of interest into the machine vision system memory. For example, if the speed at which objects pass the camera is known, and the distance between the triggering feature and the feature of interest is known, the user may calculate the time and input the time into the machine vision system software. Alternatively, the user may input the object speed and distance between the triggering feature and the feature of interest. The machine vision system may then calculate the time for supplying the triggering signal. In step ST5, the user stores the job file in vision system memory. The job file includes the data acquired during the training phase, as discussed above. In step ST6, machine vision system 100 processes a job using the job file. Exemplary steps performed by the vision system in processing the job using a job file will be discussed in more detail below.

The vision system and triggering method according to embodiments of the present invention may be used to acquire images of any feature of interest in any industry in which machine vision systems are used. Examples of such industries include mailpiece processing, semiconductor fabrication, printed circuit board manufacturing, textiles manufacturing, etc. In addition, the feature of interest that is desired to be detected and/or the signature can be two-dimensional or three-dimensional.

Figure 3A:
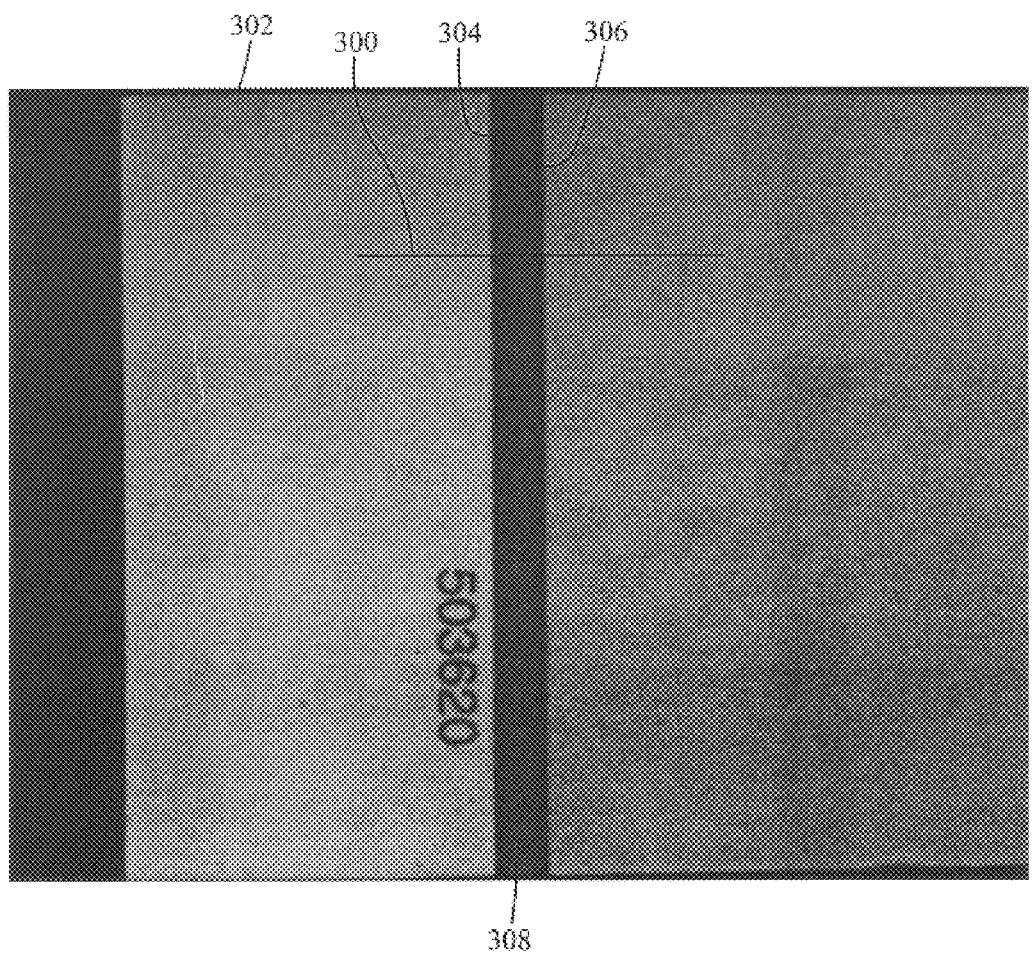
FIGS. 3A and 3B are examples of an acquired video image (3A) and a corresponding signature (3B) that may be used to trigger a machine vision system according to an embodiment of the present invention.
Figure 3B:
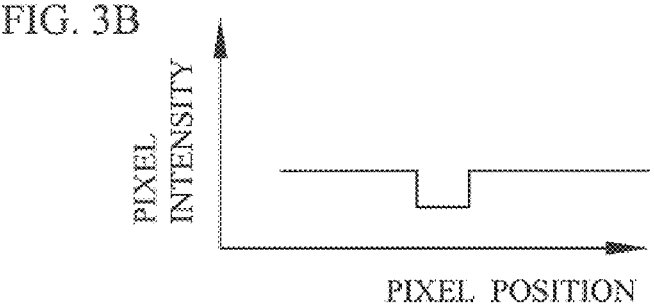

FIGS. 3A and 3B respectively illustrate an exemplary triggering feature and a corresponding signature that may be used for vision system triggering. In FIG. 3A, line 300 represents a scan line of video camera 102 (illustrated in FIG. 1). Image 302 is an image of a mailpiece. In particular, image 302 includes a light-to-dark transition 304 of a printed bar and a dark-to-light transition 306 of the same bar. In this example, the printed bar 308 is the triggering feature.

FIG. 3B illustrates the signature corresponding to triggering feature 308 illustrated in FIG. 3A. In FIG. 3B, the horizontal axis represents the pixel position along line 300 illustrated in FIG. 3A. The pixel position corresponds to a row of light-sensitive devices in camera 102. The vertical axis represents pixel brightness or intensity measured by camera 102 along line 300. In the illustrated example, the pixel brightness is lower for the pixels that correspond to bar 308 than it is for the pixels that correspond to the surrounding background. The signature for bar 308 is also unique in the illustrated image. Accordingly, this signature may be used to trigger acquisition of the feature of interest, such as a barcode.

Figure 4A:
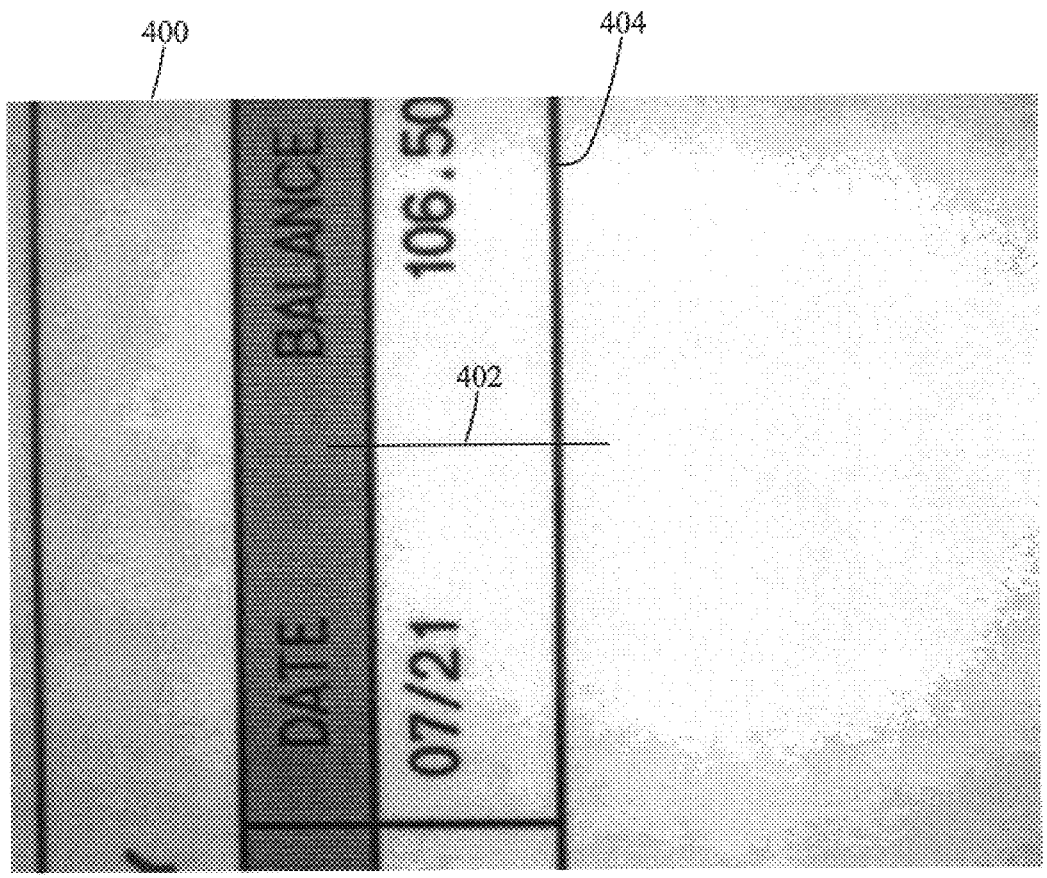
FIGS. 4A and 4B are examples of an acquired video image (4A) and a corresponding signature (4B) that may be used to trigger a machine vision system according to an embodiment of the present invention.
Figure 4B:
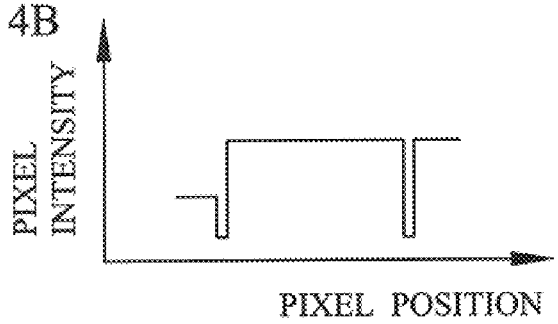

FIGS. 4A and 4B respectively illustrate another example of a triggering feature and a corresponding signature. More particularly, in FIG. 4A, image 400 represents a full-frame image that may be acquired by a programmable acquisition video camera. Scan line 402 represents a scan line of the video camera that may be used during signature detection. Feature 404, which may be a line printed on a page, may be used as the triggering feature.

FIG. 4B is a graph of the pixel intensities for each pixel measured along scan line 402 illustrated in FIG. 4A. As indicated in FIG. 4B, the pixel intensity decreases noticeably for the pixels corresponding to triggering feature 404. Accordingly, a measured pixel intensity value corresponding to triggering feature 404 may be used as a signature.

Figure 5A:
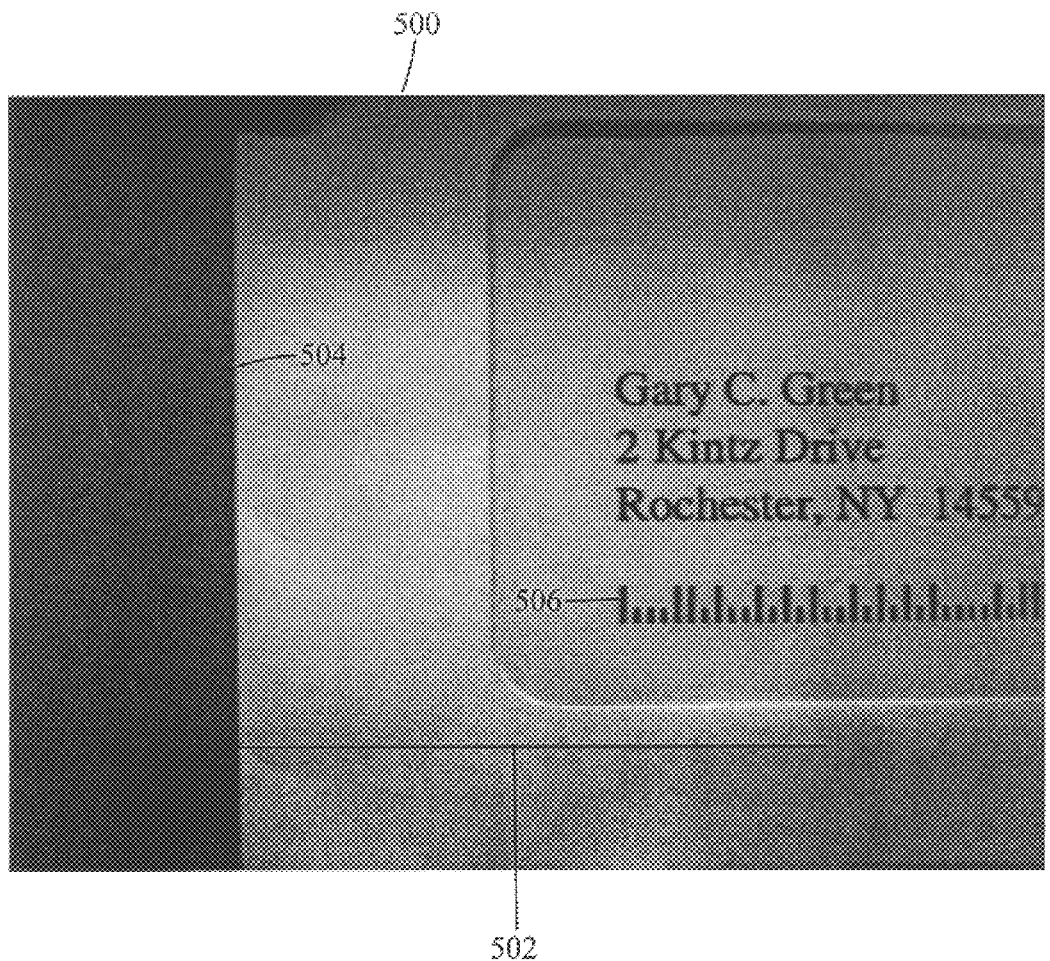
FIGS. 5A and 5B are examples of an acquired video image (5A) and a corresponding signature (5B) that may be used to trigger a machine vision system according to an embodiment of the present invention.
Figure 5B:
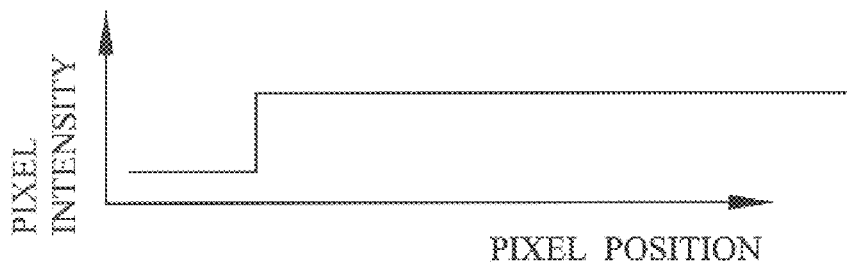

FIGS. 5A and 5B illustrate yet another example of a triggering feature and the corresponding signature. In FIG. 5A, image 500 corresponds to an envelope. Scan line 502 may be the scan line used by the video camera for signature detection. In this example, the triggering feature is selected to be edge 504 of the envelope. The feature of interest that may be acquired could be POSTNET code 506. As illustrated in FIG. 5B, the pixel intensity changes sharply when edge 504 is detected.

The signature examples discussed above relate to mailpiece processing. Such signatures may be acquired by positioning video camera 102 on or in a mailpiece processing device. Exemplary mailpiece processing devices to which the machine vision system of the present invention may be coupled include mailpiece sorters, mailpiece inserters, sheet feeders, cutters, accumulators, or any other type of mailpiece processing device through which an object containing a feature of interest, such as a bar code, passes. In addition, as stated above, the machine vision system and associated triggering method according to the present invention are not limited to mailpiece processing. The use of the triggering method in any industry in which it is desirable to acquire images of a feature of interest as the feature of interest passes through the field of view of a camera are intended to be within the scope of the invention.

Triggering Method

As stated above, once the vision system is trained to detect a predetermined signature, the user begins processing of a job and loads the job file that contains the instructions for triggering acquisition of a full-frame video image.

Figure 6:
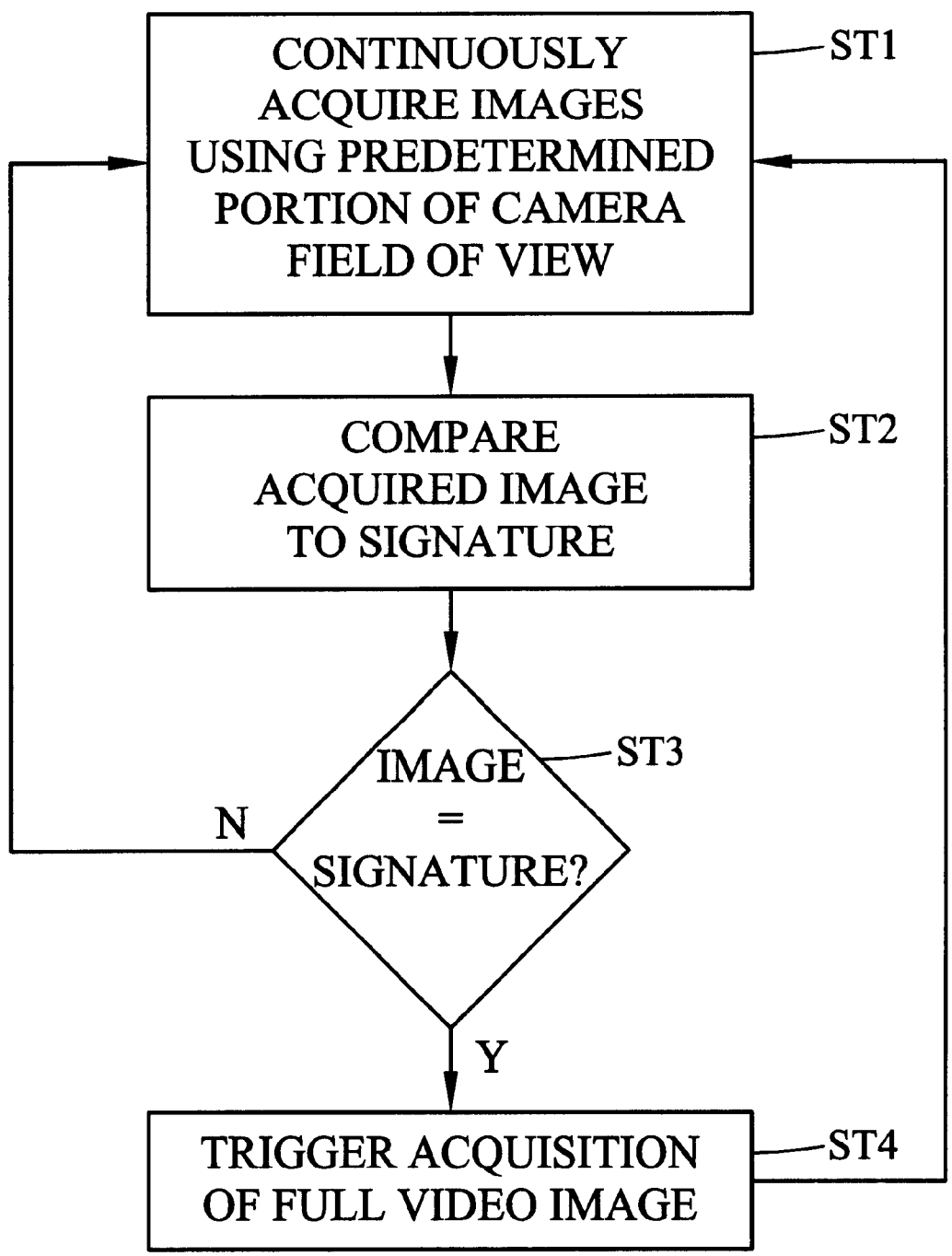
FIG. 6 is a flow chart illustrating a method for triggering a machine vision system based on an image acquired by a video camera according to an embodiment of the present invention.

FIG. 6 illustrates exemplary steps that may be performed by machine vision system 100 in triggering based on an image acquired by camera 102. Referring to FIG. 6, in step ST1, the machine vision system continuously acquires images using a predetermined portion of the camera field. The predetermined portion may be some or all of the total camera field of view. The more of an image that is acquired, the greater image acquisition time and the greater the processing required by the vision system to determine whether an acquired image corresponds to a signature. In one example, in which speed is the primary concern, the machine vision system may be programmed to acquire a single video line. In another example, the machine vision system may be programmed to acquire a plurality of lines and to average the images acquired using the plurality of lines. In such an example, the lines are preferably adjacent to each other. In yet another example, the machine vision system may be programmed to use any portion of the total field of view of the camera, including the total field of view of the camera, and to only analyze part of the acquired image. In such an example, image acquisition time may not be reduced; however, image processing time would be reduced.

In step ST2, machine vision system 100 compares the acquired image to a signature. As stated above, such a signature is computed and stored in memory during the training phase. In step ST3, if the acquired image does not correspond to the signature, processing returns to step ST1, where the camera continuously acquires the predetermined portion of the image. In step ST4, if the acquired image matches the signature, the machine vision system triggers acquisition of the full video image. As discussed above, there may be a delay between signature acquisition and image acquisition depending on the distance between the triggering feature and the feature of interest and the speed at which objects pass the camera. However, once the triggering feature is detected, the time for supplying the triggering signal is determined.

Figures 7A, 7B, 7C:
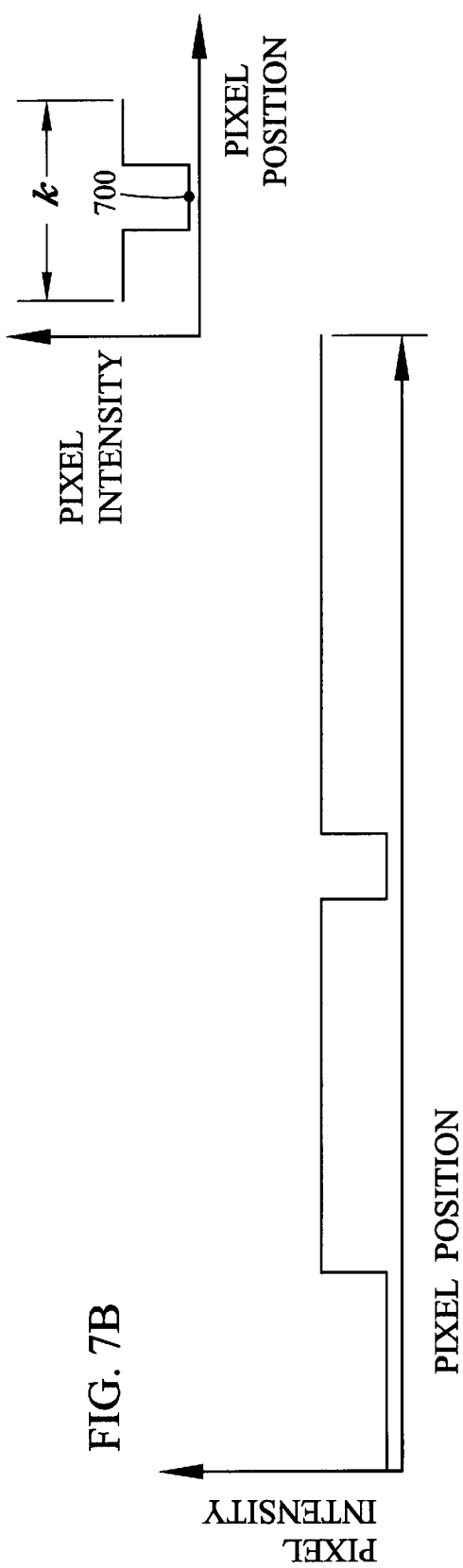
FIGS. 7A–7C are graphs respectively illustrating an exemplary triggering feature signature, an actual image signal, and an error function used in signature detection according to an embodiment of the present invention.

FIGS. 7A–7C are graphs of a signature, a video line acquired from a video image, and an error function used to determine whether the acquired image matches the signature. More particularly, FIG. 7A illustrates an exemplary signature. The signature is of width k pixels. The signature position is arbitrarily defined as the center point 700 in the signature.

FIG. 7B illustrates pixel intensity values for a single line of acquired video data. FIG. 7C is an error function resulting from comparing the signature in FIG. 7A to the acquired video data in FIG. 7B. More particularly, the signature illustrated in FIG. 7A is superimposed on each possible pixel location of the acquired video data illustrated in FIG. 7B. The pixel intensity values for the signature in FIG. 7A are subtracted from the pixel intensity values of the acquired video line in FIG. 7B at each possible location and the absolute value of the result is calculated. The error function illustrated in FIG. 7C is a result of this calculation. The peaks in the error function represent points in which the acquired image does not resemble the signature. The valleys in the error function represent the points where the acquired image resembles the signature. The forbidden bands on each end of the error function indicate pixel locations where the entire signature illustrated in FIG. 7A would not fit within image in FIG. 7B.

Because embodiments of the present invention enable triggering of a machine vision system based on a signature acquired by the vision system camera, the need for an external triggering signal supplied by a sensor or by a processing device, such as a mailpiece processing device is reduced. Accordingly, the cost and complexity of machine vision systems is also reduced. Yet another advantage of the present invention in mailpiece processing is that it increases the flexibility of locating features, such as bar codes, on mailpieces. For example, in conventional mailpiece processing, the location of a bar code on a mailpiece may have been limited by the locations at which the external sensor could be mounted on a mailpiece processing device. Because the present invention does not require an external sensor, the flexibility of locating bar codes and other features on mailpieces is increased.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for triggering acquisition of an image of a feature of interest in a machine vision system, the method comprising:
    (a) controlling a video camera to continuously acquire images using a first predetermined portion of a field of view of the video camera;
    (b) comparing the acquired images to a predetermined signature; and
    (c) in response to determining that one of the acquired images matches the signature, triggering the video camera to acquire an image of the feature of interest using a second predetermined portion of the field of view of the camera, wherein the second predetermined portion is greater than the first predetermined portion.

2. The method of claim 1 wherein the feature of interest is a symbol printed on a mailpiece.

3. The method of claim 2 wherein continuously acquiring images includes continuously acquiring images associated with mailpieces passing through a mailpiece sheet feeder.

4. The method of claim 2 wherein continuously acquiring images includes continuously acquiring images associated with mailpieces traveling through a mailpiece cutter.

5. The method of claim 2 wherein continuously acquiring images includes continuously acquiring images associated with mailpieces traveling through a mailpiece sorter.

6. The method of claim 2 wherein continuously acquiring images includes continuously acquiring images associated with mailpieces traveling through a mailpiece inserter.

7. The method of claim 1 wherein continuously acquiring images using a first predetermined portion of the field of view of the video camera includes continuously acquiring images using a single video line.

8. The method of claim 1 wherein continuously acquiring images using a first predetermined portion of the field of view of the video camera includes continuously acquiring images using a plurality of video lines and averaging the images from the video lines.

9. The method of claim 8 wherein the plurality of video lines are adjacent to each other.

10. The method of claim 1 wherein the video camera comprises a programmable acquisition video camera.

11. The method of claim 1 wherein triggering the video camera to acquire the image of the feature of interest includes instructing the video camera to wait a predetermined time period before acquiring the image of the feature of interest.

12. The method of claim 1 wherein controlling the video camera to continuously acquire images using a first predetermined portion of the field of view of the video camera includes controlling the video camera to continuously acquire images using the full field of view of the video camera and wherein comparing the acquired images to a predetermined signature includes comparing a portion of each of the acquired images to a predetermined signature.

13. The method of claim 1 wherein comparing the acquired images to a predetermined signature includes:
   (a) determining differences between pixel intensity values of the acquired images and pixel intensity values of the predetermined signature;
   (b) generating an error function based on the differences; and
   (c) identifying the signature in the acquired images at a pixel position corresponding to a minimum in the error function.

14. A method for triggering a machine vision system associated with a mailpiece processing device to acquire an image of a feature of interest, the method comprising:
   (a) passing mailpieces by a programmable acquisition video cameraoupled to a mailpiece processing device;
   (b) acquiring images of the mailpieces using a first predetermined portion of a field of view of the camera as the mailpieces pass the camera;
   (c) comparing the images to a predetermined signature corresponding to a triggering feature associated with the mailpieces; and
   (d) in response to determining that one of the images matches the signature, triggering the camera to acquire an image of a feature of interest associated with the mailpieces using a second predetermined portion of the field of view of the camera, wherein the second predetermined portion is greater than the first predetermined portion.

15. The method of claim 14 wherein the predetermined signature comprises printed material on a mailpiece.

16. The method of claim 14 wherein the predetermined signature comprises a leading or trailing edge of a mailpiece.

17. The method of claim 14 wherein the feature of interest comprises a bar code printed on a mailpiece.

18. A machine vision system comprising:
   (a) a video camera for acquiring an image of a feature of interest using a first predetermined portion of a field of view of the camera; and
   (b) a vision processor/controller operatively associated with the video camera for triggering the camera to acquire an image of the feature of interest in response to detection of a predetermined signature by the video camera using a second predetermined portion of the field of view of the camera, wherein the first predetermined portion is greater than the second predetermined portion.

19. The system of claim 18 wherein the first predetermined portion is the total field of view of the video camera.

20. The system of claim 19 wherein the second predetermined portion is a single video line.

21. The system of claim 19 wherein the second predetermined portion is a plurality of video lines and the vision processor/controller is adapted to average images obtained using the video lines.

22. The system of claim 21 wherein the plurality of video lines are adjacent to each other.

23. The system of claim 18 wherein the vision processor/controller is adapted to trigger the camera to control the video camera to acquire an image using the total field of view of the camera before detection of the signature and to analyze the second predetermined portion of the total field of view in order to detect the signature.

24. The system of claim 18 wherein the video camera comprises a programmable acquisition video camera.

25. A mailpiece processing system comprising:
   (a) a mailpiece processing device for receiving mailpieces and for performing a processing function on the mailpieces;
   (b) a machine vision system coupled to the mailpiece processing device including:
      (i) a video camera for acquiring images of the mailpieces using a first predetermined portion of a field of view of the camera; and
      (ii) a vision processor/controller coupled to the camera for analyzing the images acquired by the camera, comparing the images to a predetermined signature, and triggering the video camera to acquire an image of a feature of interest associated with the mailpieces using a second predetermined portion of the field of view of the camera in response to detecting a match between one of the acquired images and the signature, wherein the second predetermined portion is greater than the first predetermined portion.

26. The system of claim 25 wherein the video camera comprises a programmable acquisition video camera.

27. The system of claim 25 wherein the mailpiece processing device comprises a sheet feeder.

28. The system of claim 25 wherein the mailpiece processing device comprises a mailpiece cutter.

29. The system of claim 25 wherein the mailpiece processing device comprises a mailpiece sorter.

30. The system of claim 25 wherein the mailpiece processing device comprises a sorter.

31. A computer program product comprising computer-executable instructions embodied in a computer readable medium for performing steps comprising:
   (a) controlling a video camera to continuously acquire images of an object of interest using a first predetermined portion of the field of view of the video camera;
   (b) comparing the images acquired by the video camera to a predetermined signature; and
   (c) in response to determining that one of the images matches the signature, triggering the video camera to acquire an image of a feature of interest using a second predetermined portion of the field of view of the camera, wherein the second predetermined portion is greater than the first predetermined portion.

32. The computer program product of claim 31 wherein triggering the video camera to acquire an image of the feature of interest includes expanding the field of view of the camera to the total field of view of the video camera.

33. The computer program product of claim 31 wherein triggering the video camera to acquire an image of a feature of interest includes triggering the video camera to acquire the image at a predetermined time period after acquisition of the predetermined signature.

34. The computer program product of claim 31 wherein controlling a video camera to continuously acquire images of an object of interest using a first predetermined portion of the field of view of the camera includes controlling the video camera to acquire images using a single video line.

35. The computer program product of claim 31 wherein controlling a video camera to continuously acquire images of an object of interest using a first predetermined portion of the field of view of the camera includes controlling the video camera to continuously acquire images using a plurality of video lines.

36. The computer program product of claim 35 comprising averaging the plurality of video lines to determine an average image and wherein comparing the images acquired by the video camera to the predetermined signature includes comparing the average image to the signature.

37. The computer program product of claim 36 wherein the plurality of video lines are adjacent to each other.

38. The computer program product of claim 31 wherein controlling the video camera to continuously acquire images of an object of interest using a first predetermined portion of the field of view of the video camera includes controlling the video camera to continuously acquire images of an object of interest using the total field of view of the video camera and wherein comparing the images acquired by the video camera to a predetermined signature includes comparing the first predetermined portion of each image acquired by the video camera to the predetermined signature.

39. The computer program product of claim 31 wherein triggering the video camera to acquire an image of a feature of interest includes triggering the video camera to acquire an image of a symbol printed on a mailpiece.

40. The computer program product of claim 39 wherein the symbol comprises a bar code.

41. A method for triggering machine vision acquisition of an image of a feature of interest from one of a plurality of objects, the method comprising:

(a) moving the objects past a video camera of a machine vision system;

(b) controlling the video camera to continuously acquire images of at least portions of the moving objects using a first predetermined portion of a field of view of the video camera;

(c) comparing the acquired images to a predetermined signature; and (d) in response to determining that one of the acquired images matches the signature, triggering the video camera to acquire an image of the feature of interest on one of the objects, using a second predetermined portion of the field of view of the video camera, wherein the second predetermined portion is different from the first predetermined portion.

42. A method for triggering machine vision acquisition of an image of a feature of interest from one of a plurality of objects, the method comprising:

(a) moving the objects past a video camera of a machine vision system;

(b) controlling the video camera to acquire a first image of at least a portion of one of the moving objects using a first field of view of the video camera;

(c) comparing the acquired first image to a predetermined signature; and (d) in response to determining that the acquired first image matches the signature, triggering the video camera to acquire a second image of at least a portion of one of the moving objects using a second field of view of the video camera, wherein:

(i) the second field of view is expected to cover a feature of interest on one of the objects, and (ii) the first and second fields of view are different.

* * * * *